US 9,951,876 B2

(12) United States Patent
Asanuma et al.

(10) Patent No.: US 9,951,876 B2
(45) Date of Patent: Apr. 24, 2018

(54) DOUBLE ECCENTRIC VALVE

(71) Applicant: AISAN KOGYO KABUSHIKI KAISHA, Obu-shi, Aichi-ken (JP)

(72) Inventors: Hiroshi Asanuma, Chita (JP); Sunao Kitamura, Nagoya (JP); Hiroshi Misumi, Nagoya (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 0 days.

(21) Appl. No.: 15/038,097

(22) PCT Filed: Dec. 24, 2014

(86) PCT No.: PCT/JP2014/084128
§ 371 (c)(1),
(2) Date: May 20, 2016

(87) PCT Pub. No.: WO2015/098954
PCT Pub. Date: Jul. 2, 2015

(65) Prior Publication Data
US 2016/0290513 A1    Oct. 6, 2016

(30) Foreign Application Priority Data

Dec. 25, 2013 (JP) .................................. 2013-267944
May 20, 2014 (JP) .................................. 2014-104688

(51) Int. Cl.
*F16K 1/22* (2006.01)
*F02D 9/10* (2006.01)
(Continued)

(52) U.S. Cl.
CPC ............ *F16K 1/221* (2013.01); *B23P 15/001* (2013.01); *F02D 9/1015* (2013.01);
(Continued)

(58) Field of Classification Search
CPC ... F16K 1/221; F16K 1/22; F16K 1/18; F16K 1/20; F16K 1/2007; F16K 1/24;
(Continued)

(56) References Cited

U.S. PATENT DOCUMENTS 2,673,061 A * 3/1954 Broz .......................... F16K 1/24
251/163
2,742,255 A    4/1956 Sealey
(Continued)

FOREIGN PATENT DOCUMENTS

CN    103438226 A    12/2013
DE    19959109 A1 *  7/2001  ........... F16K 1/2266
(Continued)

OTHER PUBLICATIONS

Apr. 21, 2017 Office Action issued in Chinese Patent Application No. 201480070920.9.
(Continued)

*Primary Examiner* — Reinaldo Sanchez-Medina
*Assistant Examiner* — David Colon Morales
(74) *Attorney, Agent, or Firm* — Oliff PLC

(57) ABSTRACT

A double eccentric valve includes a valve seat having a seat surface, a valve element having a sealing surface, a passage in which the valve seat and the valve element are arranged, and a rotary shaft which rotates the valve element attached to an attaching part of the rotary shaft. With respect to the valve element and the valve hole, a main axis of the rotary shaft is doubly eccentric in a passage direction and a direction perpendicular to the passage. By rotation about the main axis, the valve element moves between a fully closed position where the sealing surface contacts the seat surface and a fully open position where the sealing surface is furthest away from the seat surface. A second axis of the attaching part extends parallel to the main axis and eccen-
(Continued)

trically in a radial direction of the rotary shaft from the main axis.

11 Claims, 14 Drawing Sheets

(51) Int. Cl.
| | |
|---|---|
| *F16K 1/20* | (2006.01) |
| *F02M 26/48* | (2016.01) |
| *F02M 26/54* | (2016.01) |
| *F02M 26/70* | (2016.01) |
| *F02M 26/00* | (2016.01) |
| *B23P 15/00* | (2006.01) |
| *F16K 31/04* | (2006.01) |

(52) U.S. Cl.
CPC ........... *F02D 9/1025* (2013.01); *F02M 26/00* (2016.02); *F02M 26/48* (2016.02); *F02M 26/54* (2016.02); *F02M 26/70* (2016.02); *F16K 1/20* (2013.01); *F16K 1/2014* (2013.01); *F16K 1/222* (2013.01); *F16K 31/041* (2013.01)

(58) Field of Classification Search
CPC ........ F02M 26/00; F02M 26/48; F02M 26/54; F02M 26/70; B23P 15/001; F02D 9/1015; F02D 9/1025
USPC .......................................... 251/192, 305, 308
See application file for complete search history.

(56) References Cited

U.S. PATENT DOCUMENTS

| | | | | |
|---|---|---|---|---|
| 3,343,805 A * | 9/1967 | Felton | ....................... | F16K 1/22 251/306 |
| 3,623,696 A | 11/1971 | Baumann | | |
| 3,675,894 A * | 7/1972 | Friedell | .................... | F16K 5/204 251/163 |
| 3,809,361 A * | 5/1974 | Pfundstein | .............. | F16K 1/226 251/162 |
| 3,931,955 A * | 1/1976 | Jacobs | .................... | F16K 1/226 251/173 |
| 4,073,470 A * | 2/1978 | Harris | ....................... | F16K 1/24 251/161 |
| 4,133,512 A * | 1/1979 | Johnson | ................ | F16K 1/2285 251/173 |
| 4,265,426 A * | 5/1981 | Thurston | ............... | F16K 1/2263 251/306 |
| 4,281,817 A * | 8/1981 | Adams | ................... | F16K 1/2263 251/305 |
| 4,284,264 A * | 8/1981 | Hubertson | ............ | F16K 1/2263 251/305 |
| 4,296,915 A * | 10/1981 | Baumann | .............. | F16K 1/2266 251/174 |
| 4,313,592 A * | 2/1982 | Baas | ........................ | F16K 1/24 251/162 |
| 4,407,483 A * | 10/1983 | Gachot | ................... | F16K 1/222 251/287 |
| 4,436,281 A * | 3/1984 | Chiron | ................... | F16K 1/226 251/305 |
| 4,480,815 A * | 11/1984 | Kreij | ....................... | F16K 1/222 251/298 |
| 4,489,917 A * | 12/1984 | Baumann | ................ | F16K 1/222 251/305 |
| 4,601,459 A * | 7/1986 | Verdelet | ................. | F16K 1/226 251/305 |
| 4,770,392 A * | 9/1988 | Schmidt | .................. | F16K 1/24 251/158 |
| 4,770,393 A * | 9/1988 | Hubertson | ............ | F16K 1/2263 251/305 |
| 4,921,212 A * | 5/1990 | deQuay | ..................... | F16K 1/24 251/160 |
| 5,125,624 A * | 6/1992 | Yohner | ..................... | F16K 1/22 251/305 |
| 5,158,265 A * | 10/1992 | Miyairi | .................... | F16K 1/222 251/305 |
| 5,193,572 A * | 3/1993 | Le Devehat | ............ | F16L 55/46 137/244 |
| 5,275,375 A * | 1/1994 | Semence | ................ | F02D 9/1055 123/400 |
| 5,330,157 A * | 7/1994 | Dern | ......................... | F16K 1/24 251/162 |
| 5,707,040 A * | 1/1998 | Gasaway | ............... | F16K 1/2263 251/305 |
| 5,713,556 A * | 2/1998 | Yokota | ..................... | F16K 1/24 251/228 |
| 5,947,445 A * | 9/1999 | Wang | ..................... | F16K 1/2263 251/173 |
| 5,957,428 A * | 9/1999 | Yokota | ..................... | F16K 1/24 251/304 |
| 6,029,949 A * | 2/2000 | Brown | ...................... | F16K 1/24 251/305 |
| 6,135,415 A * | 10/2000 | Kloda | .................... | F02M 26/70 123/568.18 |
| 6,149,130 A * | 11/2000 | Thurston | ................. | F16K 1/22 137/557 |
| 6,193,214 B1 * | 2/2001 | Schatz | ..................... | F02D 9/06 123/323 |
| 6,328,281 B1 * | 12/2001 | Jung | ......................... | F02D 9/10 251/305 |
| 6,589,380 B2 * | 7/2003 | Gnage | ................. | B29C 65/1635 156/272.8 |
| 6,702,257 B1 * | 3/2004 | Mollmann | .............. | F16K 1/222 251/305 |
| 6,739,579 B1 * | 5/2004 | Rim | ....................... | F01N 3/0842 251/306 |
| 7,011,298 B2 * | 3/2006 | Gerhardy | .............. | F02D 9/1045 123/73 PP |
| 7,172,174 B2 * | 2/2007 | Sano | .................... | B29C 65/1635 219/121.64 |
| 7,546,828 B2 * | 6/2009 | Kuhnel | ................ | B29C 45/0017 123/305 |
| 7,669,581 B2 * | 3/2010 | Sasaki | ........................ | F02D 9/04 123/399 |
| 7,789,372 B2 * | 9/2010 | Fornara | ................... | F02B 31/06 123/337 |
| 8,201,401 B2 * | 6/2012 | Abram | .................... | F01N 1/166 137/115.16 |
| 2007/0063163 A1 * | 3/2007 | Yeary | ........................ | F16K 1/22 251/305 |
| 2007/0240690 A1 * | 10/2007 | Nanba | ................... | F16K 31/041 123/568.18 |
| 2011/0073789 A1 * | 3/2011 | Yeary | ....................... | F16K 1/222 251/118 |
| 2011/0272613 A1 * | 11/2011 | Watanuki | ................. | F16K 1/226 251/314 |
| 2012/0061603 A1 | 3/2012 | Kurihara et al. | | |
| 2012/0181468 A1 * | 7/2012 | Telep | ....................... | F01M 13/0011 251/304 |
| 2013/0068981 A1 * | 3/2013 | Hotta | ........................ | F16K 1/24 251/305 |
| 2013/0153803 A1 * | 6/2013 | Adenot | ................. | F02D 9/1015 251/298 |
| 2013/0153804 A1 * | 6/2013 | Adenot | ................. | F02D 9/1025 251/305 |
| 2013/0248748 A1 * | 9/2013 | Baumann | .............. | F16K 1/2057 251/305 |

FOREIGN PATENT DOCUMENTS

| | | | | |
|---|---|---|---|---|
| EP | 0029110 A1 * | 5/1981 | ............... | F16K 1/22 |
| EP | 0 493 921 A1 | 7/1992 | | |
| GB | 1433918 A * | 4/1976 | ............. | F16K 1/221 |
| JP | S58-138865 U | 9/1983 | | |
| JP | H05-25075 U | 4/1993 | | |
| JP | H05-302677 A | 11/1993 | | |

(56) References Cited

FOREIGN PATENT DOCUMENTS

| JP | H07-4532 A | 1/1995 |
| JP | H10-299907 A | 11/1998 |
| JP | 2005-344765 A | 12/2005 |
| JP | 2011-047290 A | 3/2011 |
| JP | 2011-196464 A | 10/2011 |
| JP | 2012-031883 A | 2/2012 |
| WO | 2011/076891 A1 | 6/2011 |
| WO | WO 2011076891 A1 * | 6/2011 ............... F02D 9/10 |

OTHER PUBLICATIONS

Jun. 28, 2016 International Preliminary Report on Patentability issued in International Patent Application No. PCT/JP2014/084125.
Mar. 17, 2015 Office Action issued in Japanese Patent Application No. 2015-501258.
Jun. 28, 2016 Written Opinion/International Preliminary Report on Patentability issued in International Patent Application No. PCT/JP2014/084128.
Mar. 24, 2015 Search Report issued in International Patent Application No. PCT/JP2014/084125.
Mar. 24, 2015 Search Report issued in International Patent Application No. PCT/JP2014/084128.
U.S. Appl. No. 15/038,102, filed May 20, 2016.
Jul. 26, 2017 Office Action Issued in U.S Appl. No. 15/038,102.
Jan. 12, 2018 Office Action Issued in U.S. Appl. No. 15/038,102.

* cited by examiner

DOUBLE ECCENTRIC VALVE

CROSS-REFERENCE TO RELATED APPLICATIONS

This is a U.S. national phase application based on the PCT International Patent Application No. PCT/JP2014/084128 filed on Dec. 24, 2014, and claiming the priority of Japanese Patent Applications Nos. 2013-267944 filed on Dec. 25, 2013 and 2014-104688 filed on May 20, 2014, the entire contents of which are herewith incorporated by reference.

TECHNICAL FIELD

The present invention relates to a double eccentric (offset) valve in which a valve element is placed with a rotation center (a rotary shaft) positioned eccentrically from a center of a valve hole of a valve seat and a sealing surface of the valve element is positioned eccentrically from the rotary shaft.

BACKGROUND ART

As one example of the techniques of the type described above, there is conventionally known a ball-valve type double eccentric valve disclosed in Patent Document 1 listed below. This double eccentric valve is provided with a valve seat including a valve hole and an annular seat surface formed on the edge of the valve hole, a valve element having a circular disc shape and an annular sealing surface on its outer periphery corresponding, or conformable, to the seat surface, and a rotary shaft to rotate the valve element. Herein, the axis of the rotary shaft extends in parallel to a diametrical direction of the valve element and the valve hole and also is positioned eccentrically from the center of the valve hole in a radial direction of the valve hole. The sealing surface of the valve element is positioned eccentrically from the axis of the rotary shaft toward the extending direction of the axis of the valve element. To ensure the foregoing double eccentric structure, the valve element includes a protrusion protruded from an upper surface and fixed to the rotary shaft, and the protrusion is positioned eccentrically from the center of the valve element in a radial direction thereof. Further, the outer periphery of the rotary shaft is set on the protrusion and secured thereto with a screw. By rotating of the valve element about the axis of the rotary shaft, the sealing surface is moved between a fully closed state in which the sealing is in surface contact with the seat surface of the valve seat and a fully open state in which the sealing surface is furthest away from the seat surface. In this double eccentric valve, the valve seat is provided with an elastic member, so that the seat surface of the valve seat is pressed in contact with the sealing surface of the valve element during full close to increase sealing performance in the fully closed state. When fluid pressure acts on the valve element, the valve seat is pressed against the valve element by the elastic member, thereby blocking up a gap or clearance between the valve element and the valve seat.

As other techniques, for example, there is known a butterfly-valve type double eccentric valve disclosed in Patent Document 2 listed below. In this double eccentric valve, a sealing surface of a valve element and a seat surface of a valve seat are made of metal material by buildup welding. This double eccentric valve is illustrated in schematic diagrams in FIGS. 20-22. A valve element 61 is provided, on a back side thereof, with an attachment part 64 attached to a rotary shaft 63 at a position doubly eccentric from a sealing surface 62. This attachment part 64 is fixed to the rotary shaft 63 coaxial therewith to constitute the double eccentric valve.

RELATED ART DOCUMENTS

Patent Documents

Patent Document 1: JP-A-2011-196464
Patent Document 2: JP-A-H10(1998)-299907

SUMMARY OF INVENTION

Problems to be Solved by the Invention

In the double eccentric valve disclosed in Patent Document 1, since the valve seat is pressed against the valve element by the elastic member, the sealing performance in the fully closed state is improved; however, the valve seat and the valve element may rub against each other at the time of valve opening from the fully closed state, leading to deterioration in valve-opening response. In this double eccentric valve, furthermore, the valve element comes into contact with the valve seat at an early stage near a valve closed position and rotates, while contacting, to a fully closed position. Thus, the valve seat and the valve element rubbing against each other cause their abrasion or wear. This causes a problem with durability. Furthermore, the elastic member is provided to constitute the double eccentric valve, so that the number of components is increased by just that much, resulting in a complicated structure.

In the double eccentric valve disclosed in Patent Document 2, it can be used in a high temperature region. However, in case variations in part size occur, they cause problems; for example, the double eccentric valve could not open and close or a leakage flow rate is increased. To be specific, as shown in FIG. 21, when the valve element 61 is attached on the rotary shaft 63 while the valve seat 65 is provided in a position farther from the rotary shaft 63 than a predetermined position, a gap is generated between the valve element 61 and the valve seat 65 even when the valve element 61 is rotated. In contrast, as shown in FIG. 22, when the valve element 61 is attached on the rotary shaft 63 while the valve seat 65 is provided in a position nearer to the rotary shaft 63 than the predetermined position, the valve element 61 when rotated is likely to strike against the valve seat 65 and could not fully close a passage. In any case, therefore, leakage flow is increased. In the structure of the double eccentric valve disclosed in Patent Document 2, accordingly, it is essential for reducing the leakage flow rate to manage the positions and the sizes of the valve element 61 and the valve seat 65 with high accuracy. This leads to an inevitable increase in manufacturing costs.

The present invention has been made in view of the circumstances and has a purpose to provide a double eccentric valve capable of ensuring sealing performance in a fully closed state and achieving improved durability with a simple structure.

Means of Solving the Problems (1) To achieve the above purpose, one aspect of the invention provides a double eccentric valve comprising: a valve seat including a valve hole and an annular seat surface formed on an edge of the valve hole; a valve element having a circular disc shape and including an annular sealing surface formed on an outer periphery, the sealing surface corresponding to the seat surface; a passage allowing a fluid to flow through, the valve seat and the valve element being placed in the passage; and a rotary shaft to rotate the valve element, the rotary shaft having an axis extending across the passage and in a direction perpendicular to the passage, the rotary shaft being positioned eccentrically from a center of the valve hole in an extending direction of the passage and in a direction perpendicular to the passage, so that the valve element is configured to rotate about the axis of the rotary shaft between a fully closed position where the sealing surface contacts with the seat surface and a fully open position where the sealing surface is furthest away from the seat surface, wherein the rotary shaft includes an attaching part to which the valve element is attached, and, wherein when the axis of the rotary shaft is a main axis and an axis of the attaching part is a second axis, the second axis extends in parallel to the main axis and is positioned eccentrically from the main axis in a radial direction of the rotary shaft, the double eccentric valve further comprises a housing, and the rotary shaft has a free end on a side where the attaching part is provided, and the rotary shaft is supported in a cantilever manner to be rotatable with respect to the housing.

According to the foregoing structure (1), the valve element is rotated about the main axis of the rotary shaft between the fully closed position in which the sealing surface of the valve element contacts with the seat surface and the fully open position in which the sealing surface is furthest away from the seat surface. In the fully closed state, the valve hole of the valve seat is closed by the valve element, thereby shutting off a flow of fluid in the valve hole. Contact between the sealing surface and the seat surface blocks up a gap between the valve element and the valve seat, which prevents leakage of the fluid without providing any special elastic member for pressing the valve seat against the valve element. In the valve open state, in contrast, the valve hole of the valve seat is opened to allow the fluid to flow through the valve hole. Since the second axis is positioned eccentrically from the main axis in the radial direction of the rotary shaft, therefore, rotating the rotary shaft enables adjusting the position of the valve-element attaching part with respect to the valve seat. Accordingly, for example, even when the valve seat is located in a portion farther from the rotary shaft side than a predetermined position due to assembling tolerance or others, the valve element has only to be attached to the valve-element attaching part by adjustment of the position of the valve-element attaching part. This can achieve a reduction in leakage of the fluid.

(2) To achieve the foregoing purpose, another aspect of the invention provides a double eccentric valve comprising: a valve seat including a valve hole and an annular seat surface formed on an edge of the valve hole; a valve element having a circular disc shape and including an annular sealing surface formed on an outer periphery, the sealing surface corresponding to the seat surface; a passage allowing a fluid to flow through, the valve seat and the valve element being placed in the passage; and a rotary shaft to rotate the valve element, the rotary shaft having an axis extending across the passage and in a direction perpendicular to the passage, the rotary shaft being positioned eccentrically from a center of the valve hole in an extending direction of the passage and in a direction perpendicular to the passage, so that the valve element is configured to rotate about the axis of the rotary shaft between a fully closed position where the sealing surface contacts with the seat surface and a fully open position where the sealing surface is furthest away from the seat surface, wherein the rotary shaft includes an attaching part to which the valve element is attached, and, wherein when the axis of the rotary shaft is a main axis and an axis of the attaching part is a second axis, the second axis extends in parallel to the main axis and is positioned eccentrically from the main axis in a radial direction of the rotary shaft and the valve element includes a plate surface and a protrusion protruding from the plate surface, and a valve element is fixed to the rotary shaft by the protrusion bonded to the attaching part.

According to the above structure, the valve element is fixed to the rotary shaft so that the protrusion is bonded to the valve-element attaching part eccentric from the main axis of the rotary shaft. Thus, the main axis which is the center of rotation of the valve element is positioned reliably eccentrically from the axis of the valve element.

Still another aspect of the invention provides a method for manufacturing a double eccentric valve comprising: a valve seat including a valve hole and an annular seat surface formed on an edge of the valve hole; a valve element having a circular disc shape and including an annular sealing surface formed on an outer periphery, the sealing surface corresponding to the seat surface; a passage allowing a fluid to flow through, the valve seat and the valve element being placed in the passage; and a rotary shaft to rotate the valve element, the rotary shaft having an axis extending across he passage and in a direction perpendicular to the passage, the rotary shaft being positioned eccentrically from a center of the valve hole in an extending direction of the passage and in a direction perpendicular to the passage, so that the valve element is configured to rotate about the axis of the rotary shaft between a fully closed position where the sealing surface contacts with the seat surface and a fully open position where the sealing surface is furthest away from the seat surface, wherein the rotary shaft includes an attaching part to which the valve element is attached, and wherein when the axis of the rotary shaft is a main axis and an axis of the attaching part is a second axis, the second axis extends in parallel to the main axis and is positioned eccentrically from the main axis in a radial direction of the rotary shaft, the valve element includes a plate surface and a protrusion protruding from the plate surface, and the method comprises a step of welding the protrusion to the attaching part while the valve element is seated on the valve seat to fix the valve element to the rotary shaft.

Effects of the Invention

According to the above structure (1), the double eccentric valve can ensure sealing performance in the fully closed state with a simple structure without providing any special elastic member, and can improve durability.

MODE FOR CARRYING OUT THE INVENTION

A detailed description of an embodiment of a double eccentric valve of the present invention, which is embodied in an exhaust recirculation valve (EGR valve), will now be given referring to the accompanying drawings.

Figure 1:
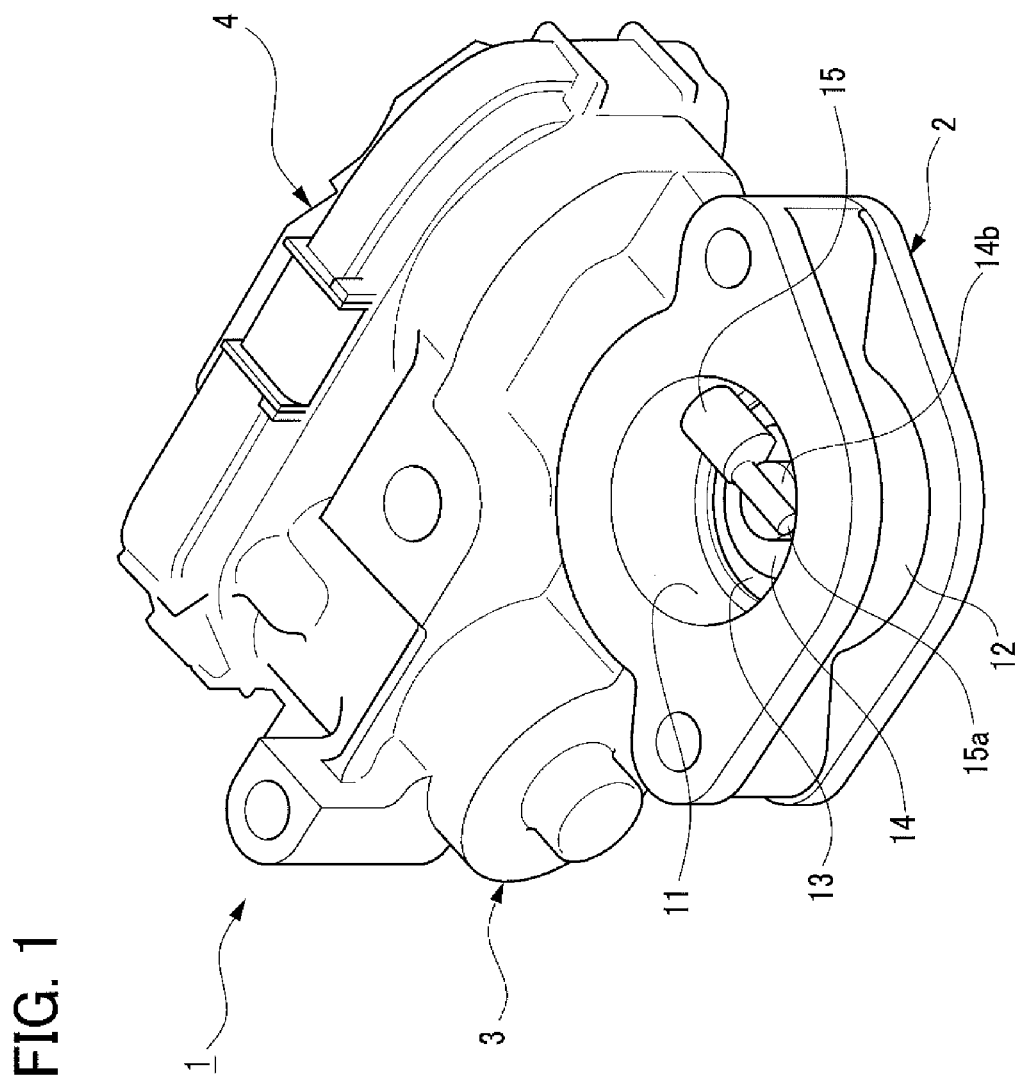
FIG. 1 is a perspective view of an electrically-operated EGR valve provided with a double eccentric valve in an embodiment.

FIG. 1 is a perspective view of an electrically-operated EGR valve 1 provided with a double eccentric valve. This EGR valve 1 includes a valve section 2 constituted of the double eccentric valve, a motor section 3 having a motor 32 built therein (see FIG. 4), and a reduction mechanism section 4 having a plurality of gears 41 to 43 built therein (see FIGS. 4 and 5). The valve section 2 includes a pipe part 12 formed with a passage 11 allowing EGR gas as a fluid to flow therethrough. In this passage 11, a valve seat 13, a valve element 14, and a rotary shaft 15 are arranged. The rotary shaft 15 receives torque of the motor 32 (see FIG. 4) through the plurality of gears 41 to 43 (see FIGS. 4 and 5).

Figure 2:
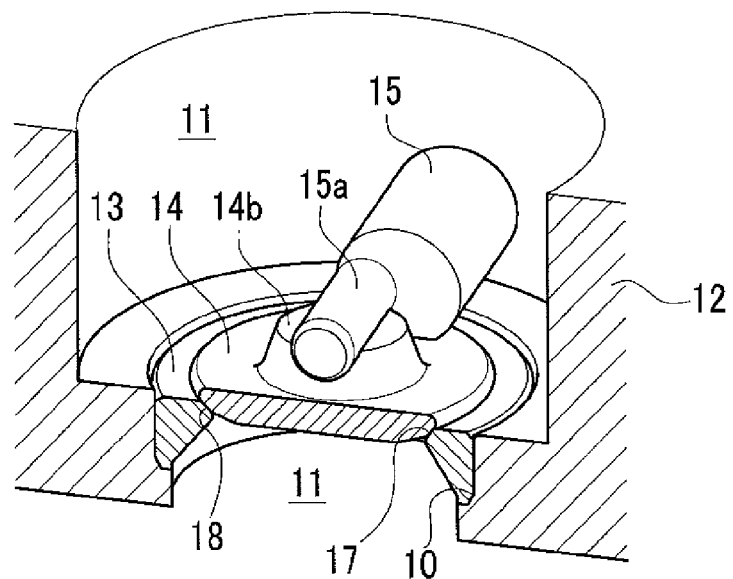
FIG. 2 is a partially cutaway perspective view of a valve section in a fully closed state where a valve element is seated on a valve seat in the embodiment.

FIG. 2 is a partially cutaway perspective view of the valve section 2 in a fully closed state (a fully closed position) in which the valve element 14 is seated on the valve seat 13.

Figure 3:
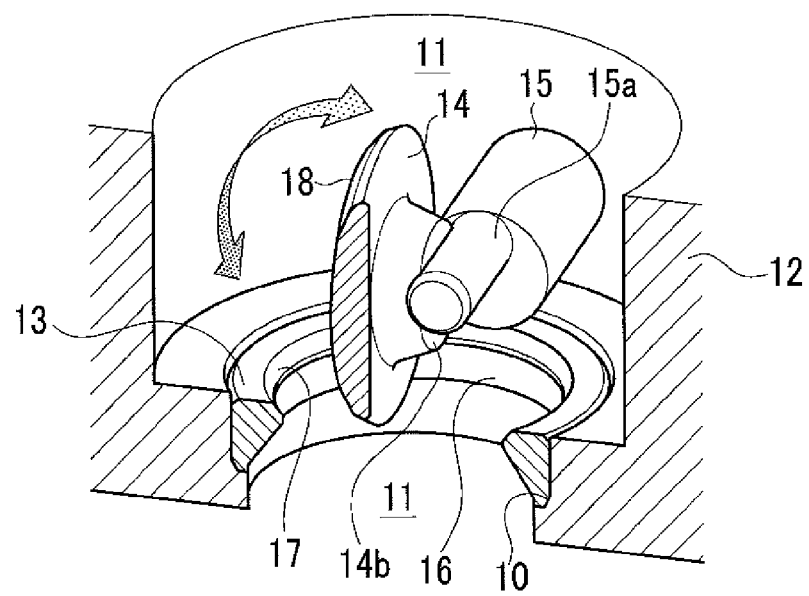
FIG. 3 is a partially cutaway perspective view of the valve section in a fully open state where the valve element is furthest away from the valve seat in the embodiment.

FIG. 3 is a partially cutaway perspective view of the valve section 2 in a fully open state (a fully open position) in which the valve element 14 is furthest away from the valve seat 13. As shown in FIGS. 2 and 3, the passage 11 is formed with a step 10 on which the valve seat 13 is fixed by press fit. The valve seat 13 has an annular shape formed with a valve hole 16 in the center. On an edge of the valve hole 16, an annular seat surface 17 is formed. The valve element 14 has a circular disc shape with an annular sealing surface 18 on an outer periphery corresponding to the seat surface 17. The valve element 14 is fixed to the rotary shaft 15 and movable integrally with the rotary shaft 15. In FIGS. 2 and 3, the passage 11 above the valve element 14 indicates an upstream side in a flow of EGR gas and the passage 11 below the valve seat 13 indicates a downstream side in the flow of EGR gas. In the passage 11, specifically, the valve element 14 is fixed to the rotary shaft 15 on a more upstream side in a flow direction of EGR gas than the valve seat 13.

Figure 4:
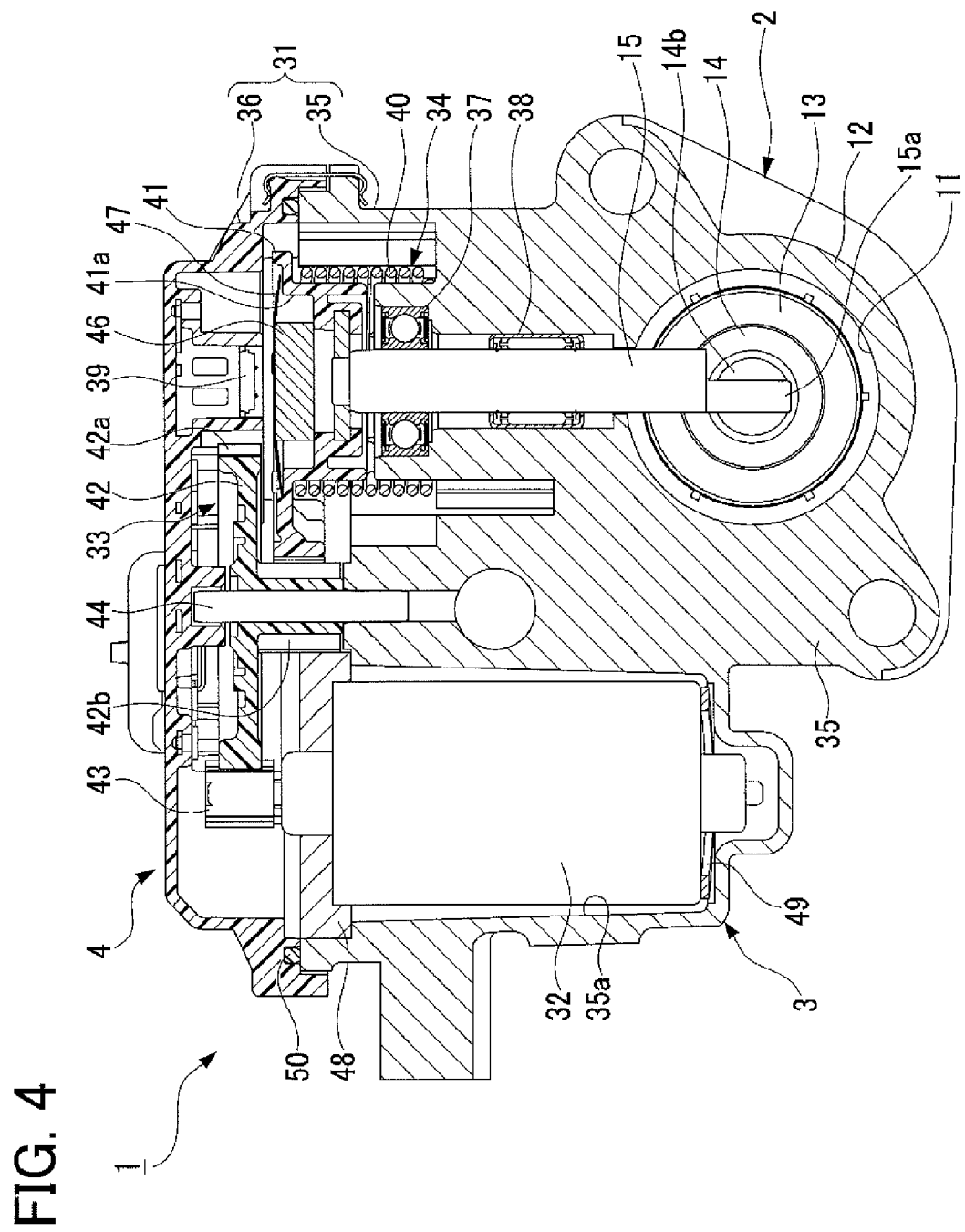
FIG. 4 is a plane cross sectional view of an EGR valve in the fully closed state in the embodiment.

FIG. 4 is a plane cross sectional view of the EGR valve 1 in the fully closed state. This EGR valve 1 is provided, as main components, with an EGR body 31, the motor 32, a reduction mechanism 33, and a return mechanism 34, in addition to the rotary shaft 15 and the valve element 14.

In the present embodiment, the EGR body 31 includes a valve housing 35 made of aluminum including the passage 11 and the pipe part 12, and an end frame 36 made of synthetic resin and placed to close an open end of the valve housing 35. The rotary shaft 15 and the valve element 14 are provided in the valve housing 35. Specifically, the rotary shaft 15 includes an attaching part 15a having a columnar shape protruding from a distal end of the rotary shaft 15. The rotary shaft 15 has a free end on a side with the distal end in which the attaching part 15a is provided. The rotary shaft 15 is placed with the distal end inserted in the passage 11 of the pipe part 12. Further, the rotary shaft 15 is supported in a cantilever manner to be rotatable with respect to the valve housing 35 through two bearings, i.e., a first bearing 37 and a second bearing 38, which are arranged along the rotary shaft 15 on its base end side and spaced apart from each other. The first bearing 37 consists of a ball bearing and the second bearing 38 consists of a needle bearing. The valve element 14 is fixedly welded to the attaching part 15a formed on a distal end of the rotary shaft 15 and is placed in the passage 11.

Figure 5:
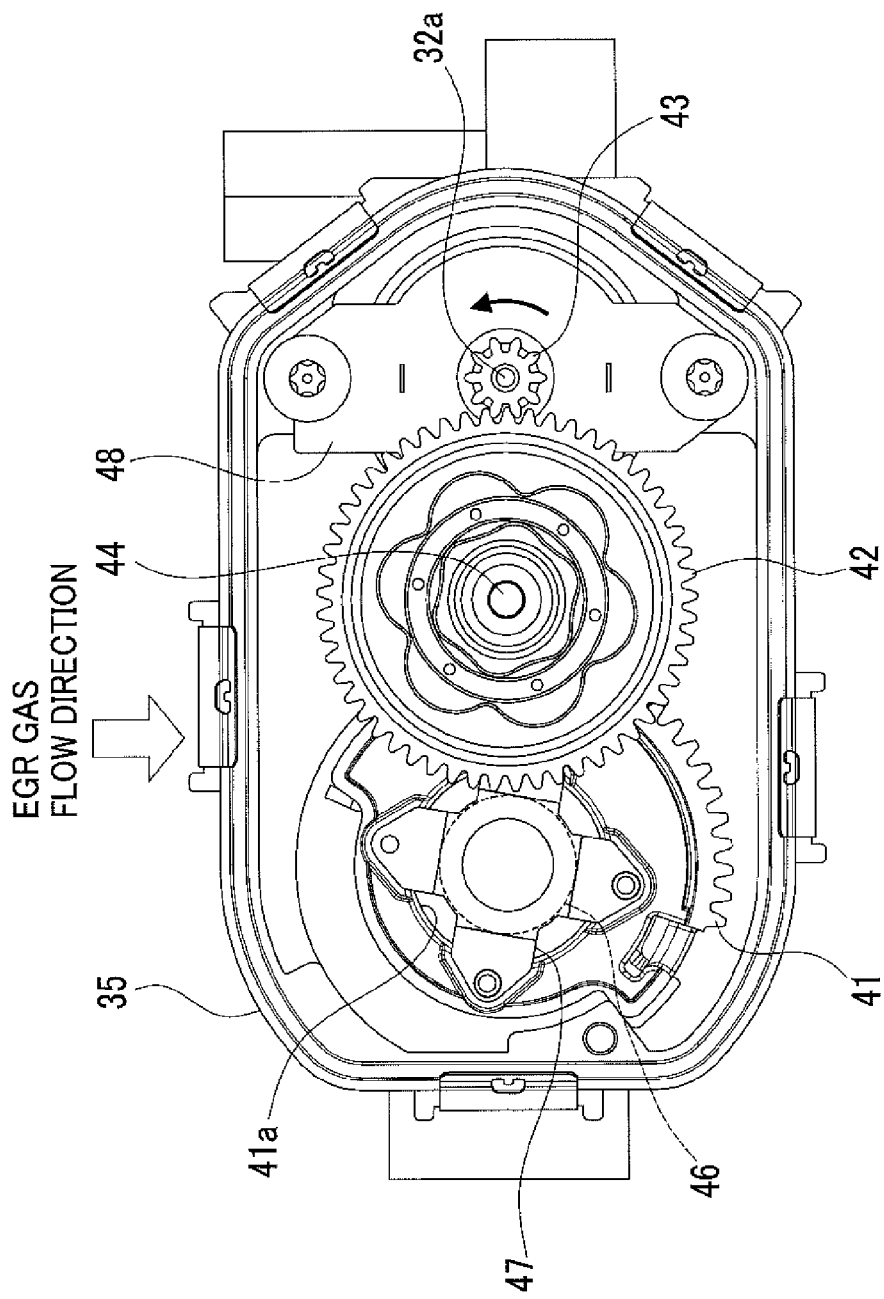
FIG. 5 is a back view of the EGR valve in the fully closed state, showing a state where an end frame has been detached from a valve housing, in the embodiment.
Figure 6:
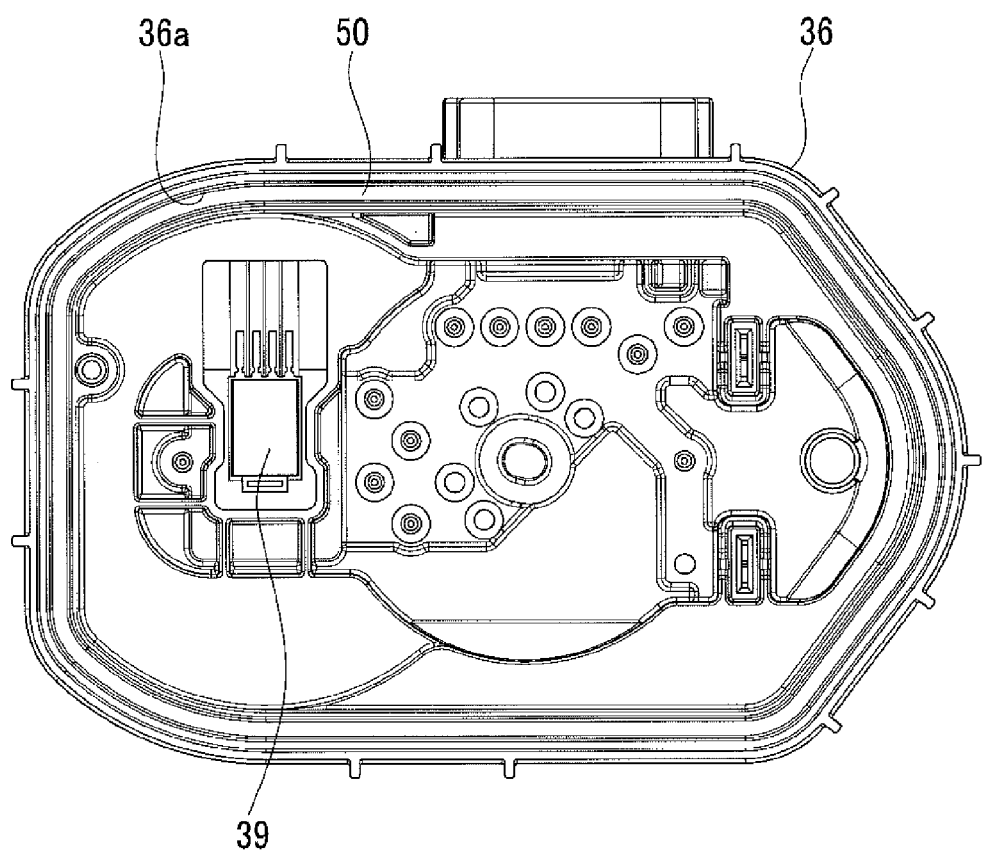
FIG. 6 is a front view of inside of the end frame in the embodiment.

FIG. 5 is a back view of the EGR valve 1 in the fully closed state, showing a state where the end frame 36 has been detached from the valve housing 35. FIG. 6 is a front view of the inside of the end frame 36. This end frame 36 is fixed to the valve housing 35 with a plurality of clips (not shown). As shown in FIGS. 4 and 6, inside the end frame 36, an EGR opening sensor 39 for detecting an opening degree (an EGR opening degree) of the valve element 14 is installed in correspondence with a base end of the rotary shaft 15. This EGR opening sensor 39 consists of a hole IC and others and is configured to detect a rotation angle of the rotary shaft 15 as the EGR opening degree. As shown in FIGS. 4 and 5, a main gear 41 is fixed at the based end of the rotary shaft 15. A return spring 40 is provided between the main gear 41 and the valve housing 35 to urge the valve element 14 in a closing direction. The main gear 41 is formed, on its back side, with a recess 41a in which a magnet 46 is accommodated. This magnet 46 is borne down by a retainer plate 47 formed of a leaf spring and mounted on the magnet 46. Thus, when the main gear 41 is rotated together with the valve element 14 and the rotary shaft 15, the magnetic field of the magnet 46 change and the EGR opening sensor 39 detects this change in magnetic field as the EGR opening degree.

The position of the main gear 41 in FIG. 5 represents the position of the main gear 41 at which the EGR valve 1 is in the fully closed state.

In the present embodiment, the motor 32 is fixedly accommodated in an accommodation cavity 35a formed in the valve housing 35. Specifically, the motor 32 set in the cavity 35a is fixed in the valve housing 35 through a stopper plate 48 and a leaf spring 49 provided at both ends of the motor 32. The motor 32 is drivingly coupled to the rotary shaft 15 through the reduction mechanism 33 to drive the valve element 14 to open and close. In other words, the motor gear 43 is fixed on an output shaft 32a of the motor 32. This motor gear 43 is drivingly coupled to the main gear 41 through an intermediate gear 42. The intermediate gear 42 is a two-stage gear including a large-diameter gear 42a and a small-diameter gear 42b and is rotatably supported in the valve housing 35 through a pin shaft 44. The large-diameter gear 42a is engaged with the motor gear 43, while the small-diameter gear 42b is engaged with the main gear 41. In the present embodiment, as each of the gears 41 to 43 constituting the reduction mechanism 33, a plastic gear made of resin material (only the motor gear 34 is made of metal) for weight saving.

As shown in FIG. 4, there is interposed a rubber gasket 50 between connecting portions of the valve housing 35 and the end frame 36. As shown in FIG. 6, the gasket 50 is placed in a circumferential groove 36a formed on an outer circumference of an open end face of the end frame 36. In this manner, the gasket 50 is interposed between the valve housing 35 and the end frame 36, so that the inside of each of the motor section 3 and the reduction mechanism section 4 is hermetically sealed from the atmosphere.

Accordingly, as shown in FIG. 2, the motor 32 is activated upon receiving power supplied thereto to thereby rotate the output shaft 32a counterclockwise as indicated by an arrow in FIG. 5 from the fully closed state of the valve element 14, thereby rotating the motor gear 43 to rotate, and this rotation is reduced by the intermediate gear 42 and then transmitted to the main gear 41. Accordingly, the rotary shaft 15 and the valve element 14 are rotated against the urging force of the return spring 40, causing the passage 11 to open. That is, the valve element 14 is opened. Further, when torque is generated in the motor 32 by power supply to hold the valve element 14 at a certain opening degree, this torque is transmitted as a holding force to the rotary shaft 15 and the valve element 14 through the intermediate gear 42 and the main gear 41. When this holding force is balanced with the urging force of the return spring 40, the valve element 14 is held at the certain opening degree.

Figure 7:
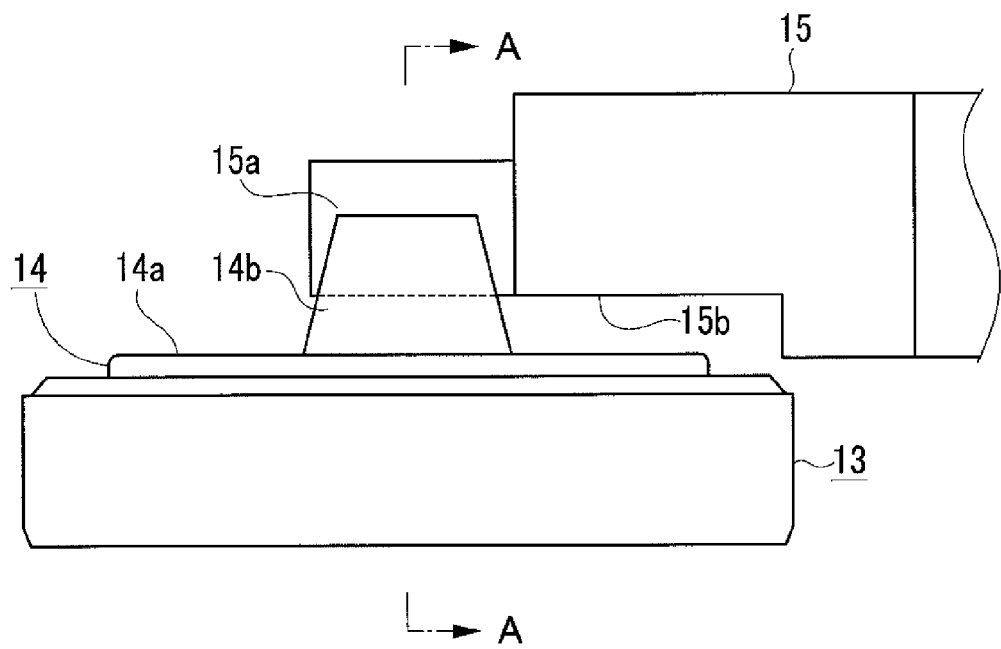
FIG. 7 is a side view of the valve seat, the valve element, and a rotary shaft in the fully closed state in the embodiment.
Figure 8:
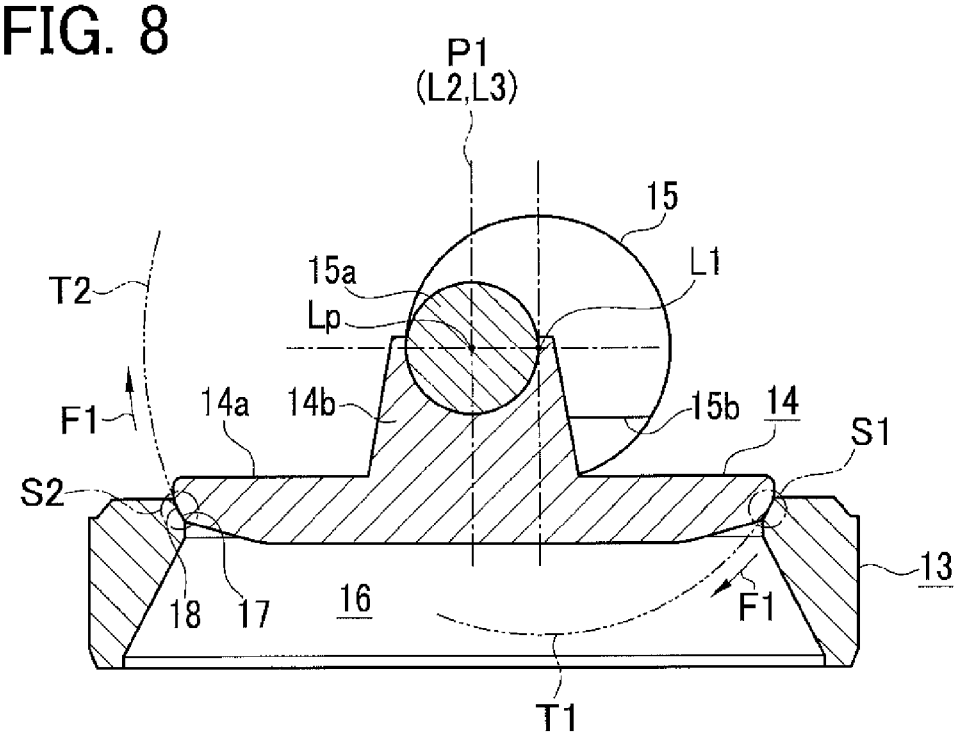
FIG. 8 is a sectional view of the valve seat, the valve element, and the rotary shaft in the fully closed state, taken along a line A-A in FIG. 7, in the embodiment.
Figure 9:
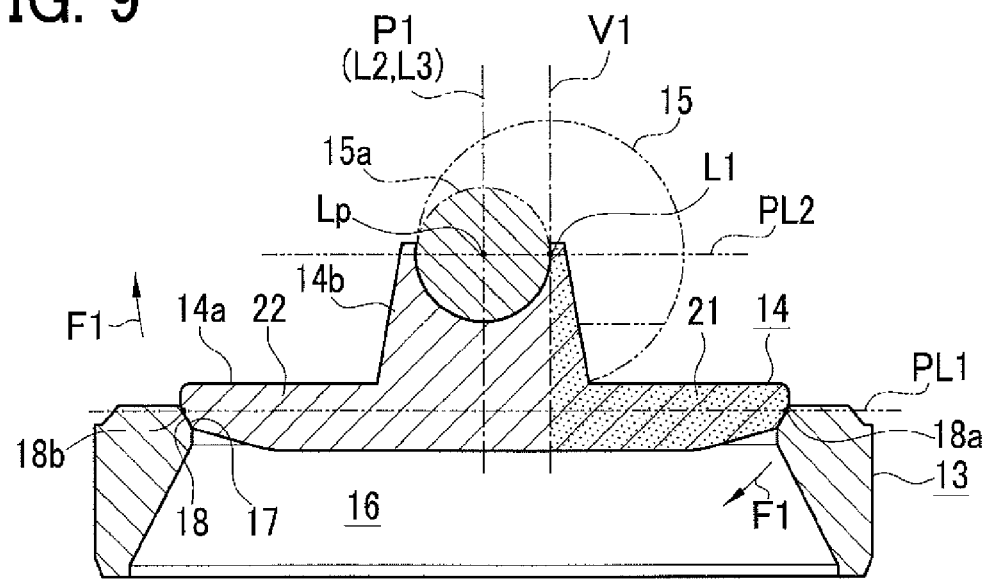
FIG. 9 is a sectional view of the valve seat and the valve element in the fully closed state in the embodiment.
Figure 10:
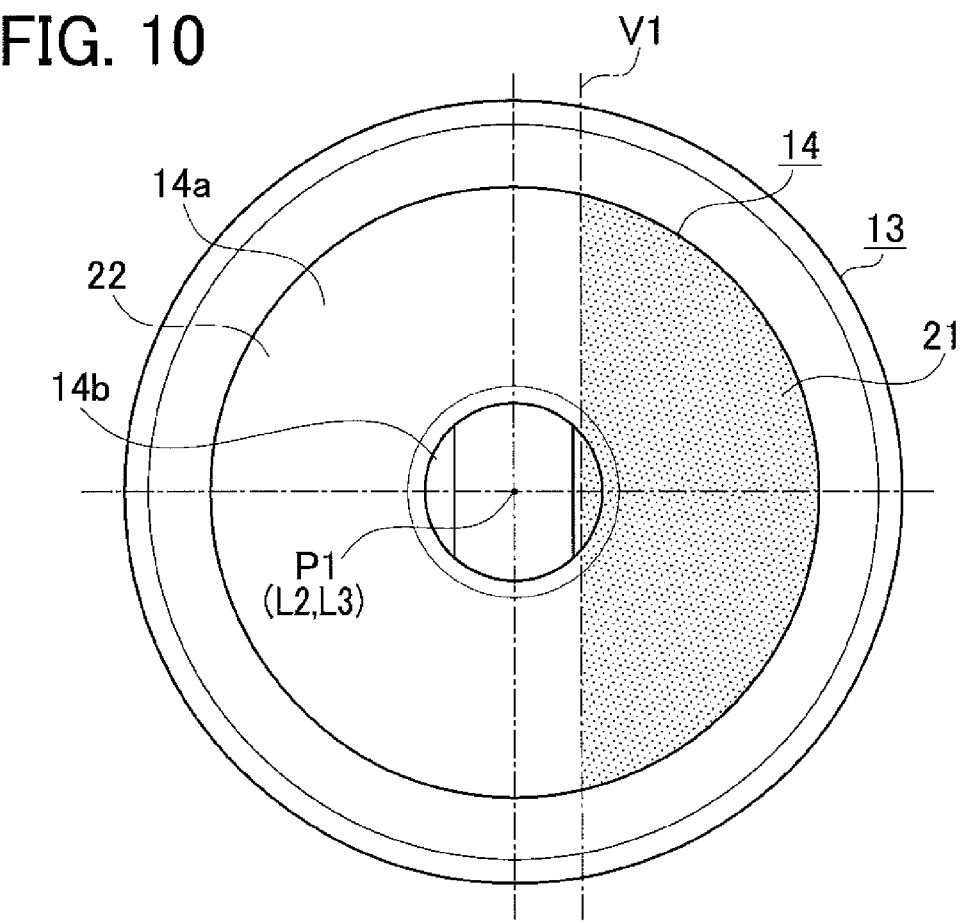
FIG. 10 is a plan view of the valve seat and the valve element in the fully closed state in the embodiment.

FIG. 7 is a side view of the valve seat 13, the valve element 14, and the rotary shaft 15 in the fully closed state. FIG. 8 is a sectional view of the valve seat 13, the valve element 14, and the rotary shaft 15 in the fully closed state, taken along a line A-A in FIG. 7. FIG. 9 is a sectional view of the valve seat 13 and the valve element 14 in the fully closed state. FIG. 10 is a plan view of the valve seat 13 and the valve element 14 in the fully closed state. As shown in FIGS. 2, 3, and 7-10, when the axis of the rotary shaft 15 is assumed to be a main axis (first axis) L1, this main axis L1 extends in a direction perpendicular to the passage 11 and is positioned eccentrically, or offset, from the center P1 of the valve hole 16 in a flow direction of the passage 11 and in a direction perpendicular to the passage 11. The valve element 14 is configured to rotate about the main axis L1 of the rotary shaft 15 between a fully closed position in which the sealing surface 18 of the valve element 14 contacts with the seat surface 17 of the valve seat 13 (see FIG. 2) and a fully open position in which the sealing surface 18 is furthest away from the seat surface 17 (see FIG. 3).

In the present embodiment, in FIG. 8, when the valve element 14 starts to rotate from the fully closed position in a valve opening direction (an arrow F direction in FIG. 8, that is, clockwise in FIG. 8), the sealing surface 18 of the valve element 14 simultaneously starts to separate from the seat surface 17 of the valve seat 13 and to move along rotation paths (trajectories) T1 and T2 about the main axis L1 of the rotary shaft 15.

Figure 11:
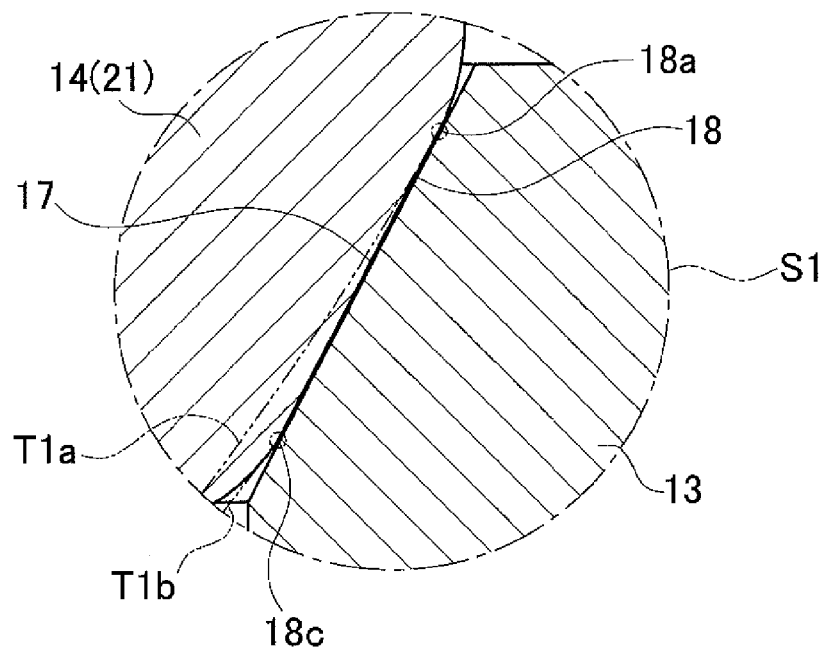
FIG. 11 is an enlarged sectional view of a region enclosed by a chain line circle S1 in FIG. 8 in the embodiment.
Figure 12:
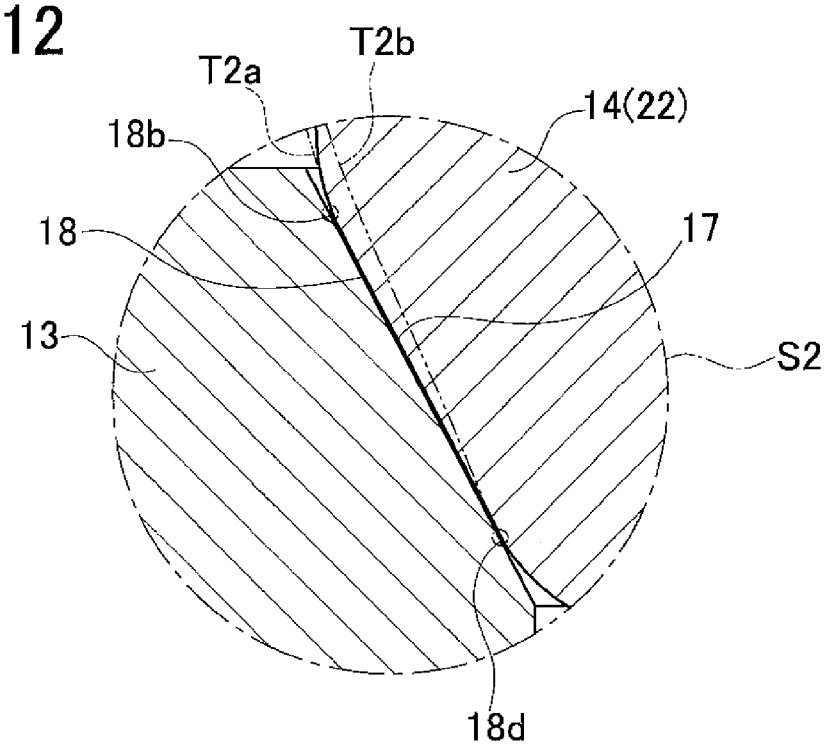
FIG. 12 is an enlarged sectional view of a region enclosed by a chain line circle S2 in FIG. 8 in the embodiment.

FIG. 11 is an enlarged sectional view of a region enclosed by a chain line circle S1 in FIG. 8. FIG. 12 is an enlarged sectional view of a region enclosed by a chain line circle S2 in FIG. 8. As shown in FIGS. 9 and 10, the valve element 14 is partitioned into two regions; one is a first side part 21 (a region shaded with dot hatching in FIGS. 9 and 10) and a second side part 22 (a region not shaded with dot hatching in FIGS. 9 and 10), with respect to a boundary defined by a virtual plane V1 extending from the main axis L1 of the rotary shaft 15 and in parallel to a direction of the central axis L3 of the valve hole 16. As shown in FIGS. 11 and 12, the sealing surface 18 of the valve element 14 includes outermost edges 18a and 18b located close to an outer circumference of the seat surface 17 of the valve seat 13 and innermost edges 18c and 18d located close to an inner circumference of the seat surface 17. When the valve element 14 rotates from the fully closed position shown in FIG. 9 in a valve opening direction indicated with an arrow F1, the first side part 21 rotates toward the inside of the valve hole 16 and the second side part 22 rotates toward the outside of the valve hole 16. Simultaneously, the outermost edges 18a and 18b and the innermost edges 18c and 18d of the sealing surface 18 of the valve element 14 are respectively turned along rotation paths T1a, T2a, T1b, and T2b about the main axis L1 of the rotary shaft 15. Herein, "T1a" denotes a rotation path of the outermost edge 18a of the first side part 21, "T2a" denotes a rotation path of the outermost edge 18b of the second side part 22, "T1b" denotes a rotation path of the innermost edge 18c of the first side part 21, and "T2b" denotes a rotation path of the innermost edge 18d of the second side part 22.

Herein, a relationship between the valve seat 13, the valve element 14, and the rotary shaft 15 will be described below. As shown in FIGS. 8 and 9, when the axis of the attaching part 15a is assumed to be a second axis Lp, this second axis Lp extends in parallel to the main axis L1 and is positioned eccentrically from the main axis L1 in a radial direction of the rotary shaft 15. As shown in FIG. 9, while the valve element 14 is held in the fully closed position, when a plane formed by the outermost edges 18a and 18b is defined as a first plane PL1 and a plane including the main axis L1 and the second axis Lp is defined as a second plane PL2, the valve element 14 is positioned so that the second plane PL2 is parallel to the first plane PL1.

Herein, as shown in FIGS. 2 and 3, each of the seat surface 17 of the valve seat 13 and the sealing surface 18 of the valve element 14 has a uniform shape over its entire circumference. Specifically, the width and the sectional shape of the seat surface 17 and the width and the sectional shape of the sealing surface 18 are formed uniformly over respective entire circumferences of the valve hole 16 and the valve element 14. Specifically, the seat surface 17 and the sealing surface 18 each have a lateral surface shape of a right circular cone.

As shown in FIGS. 7 to 10, the valve element 14 includes a protrusion 14b having a truncated cone shape protruding from a plate surface 14a and fixed to the rotary shaft 15. This protrusion 14b is fixed to the rotary shaft 15 through the attaching part 15a protruding from the distal end of the rotary shaft 15 at a position displaced or offset from the main axis L1 of the rotary shaft 15 in the radial direction of the rotary shaft 15. Further, the distal end of the rotary shaft 15 is formed with a cutout 15b to avoid interference with the valve element 14 in a state where the attaching part 15a is bonded to the protrusion 14b. As shown in FIGS. 8 to 10, furthermore, the protrusion 14b is placed on an axis L2 of the valve element 14, and the valve element 14 including the protrusion 14b is formed in a two-fold rotational symmetric shape about the axis L2 of the valve element 14.

Figure 13:
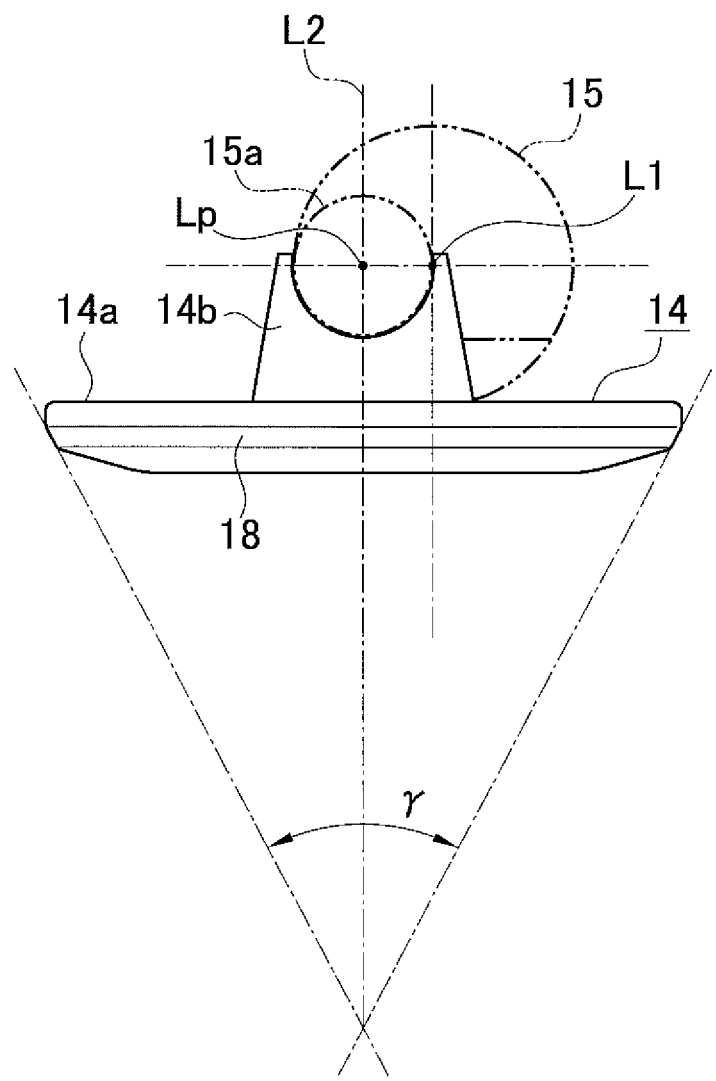
FIG. 13 is a front view of the valve element in the embodiment.
Figure 14:
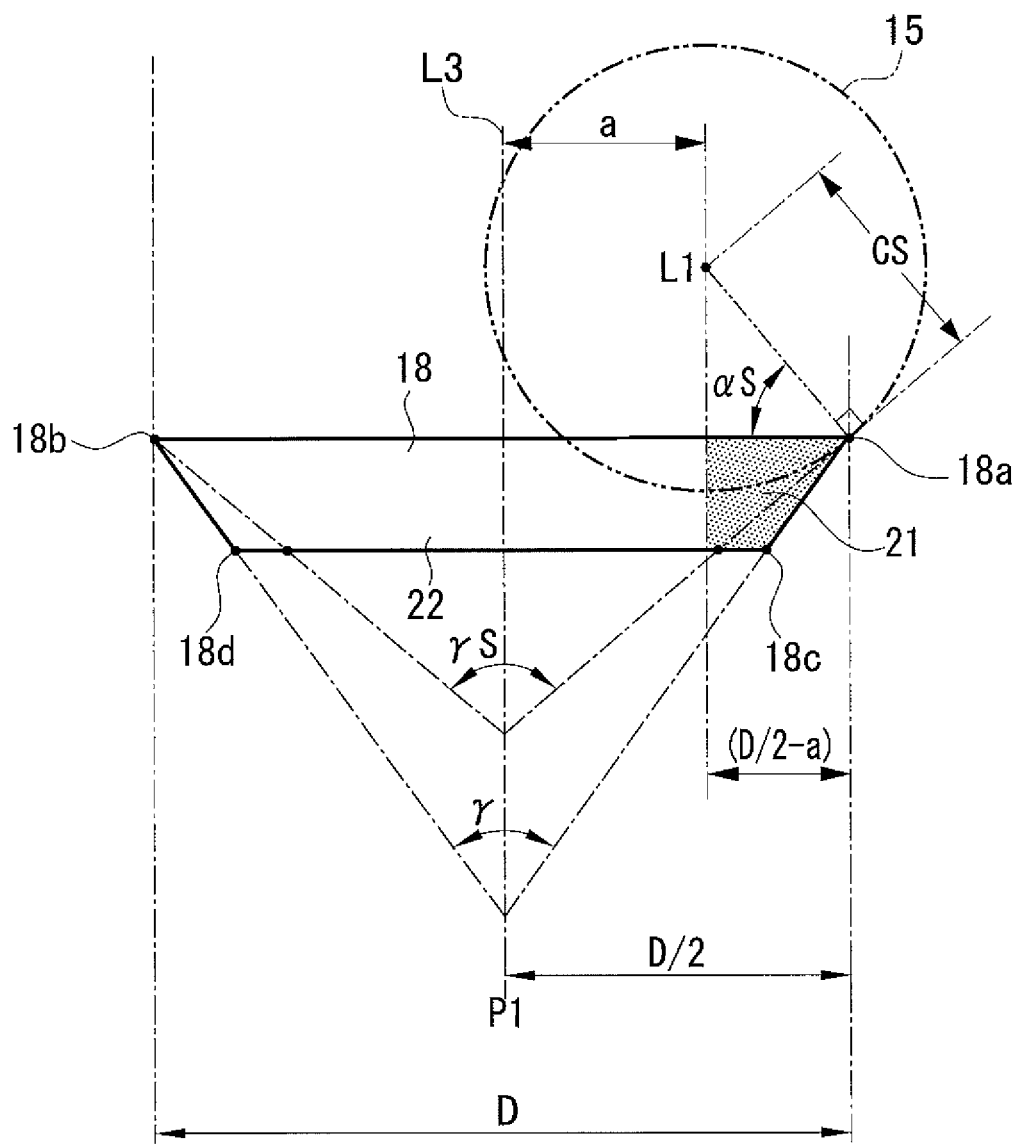
FIG. 14 is a schematic diagram showing a relationship in size of a sealing surface in FIG. 13 in the embodiment.
Figure 15:
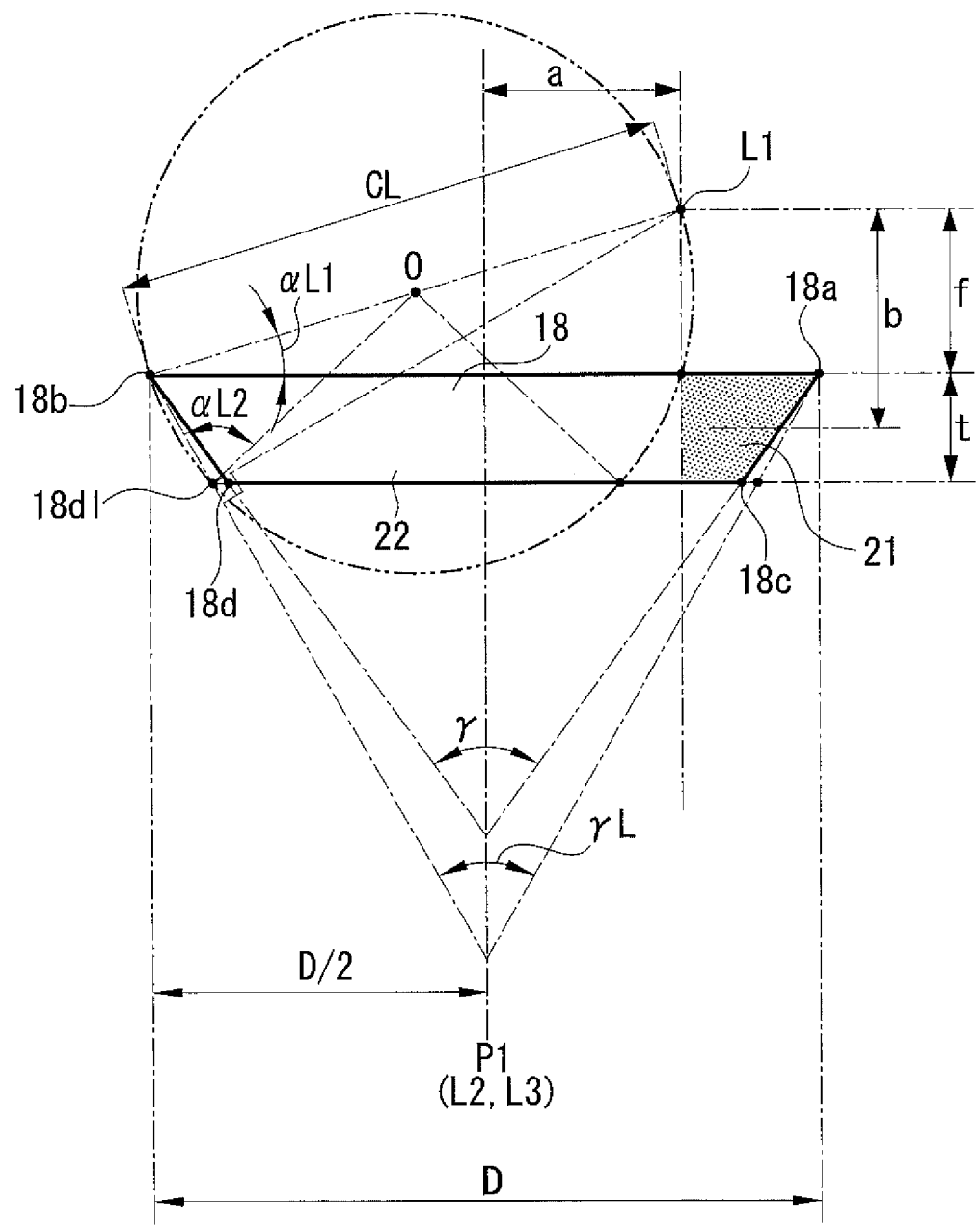
FIG. 15 is a schematic diagram showing a relationship in size of the sealing surface in FIG. 13 in the embodiment.

FIG. 13 is a front view of the valve element 14. FIGS. 14 and 15 are schematic diagrams showing a relationship in size of the sealing surface 18 in FIG. 13. In FIG. 13, the sealing surface 18 of the valve element 14 exhibits isotropy with reference to the axis L2 of the valve element 14. When an optimal open angle formed by the sealing surface 18 of the valve element 14 is assumed to be "γ", this optimal open angle γ can be set in the following manner. Firstly, a first open angle γS which is a maximum of the optimal open angle γ is explained. As shown in FIG. 14, the first open angle γS is an angle defined by a line passing through the outermost edge 18a of the sealing surface 18 in the first side part 21 and intersecting with a line extending from the main axis L1 of the rotary shaft 15 to the outermost edge 18a of the sealing surface 18 in the first side part 21. The first open angle γS is expressed by the following equation (1):

$$\gamma S = 2 * \arccos((D/2-a)/CS)[\text{rad}] \quad (1)$$

where CS is the length of a first line having a shortest distance from the main axis L1 of the rotary shaft 15 to the outermost edge 18a of the sealing surface 18 in the first side part 21, a is an offset amount of the rotary shaft 15 offset from the central axis L3 of the valve hole 16 in the radial direction of the valve hole 16, and D is the largest diameter of the sealing surface 18. This equation (1) is established from a relationship that when an angle formed between a first line extending from the main axis L1 of the rotary shaft 15 to the center of the outermost edge 18a of the sealing surface 18 in the first side part 21 and the plane including the outermost edges 18a and 18b of the sealing surface 18 is a first angle αS in FIG. 14, an angle twice as large as the first angle αS corresponds to the first open angle γS.

Secondly, a second open angle γL which is a minimum of the optimal open angle γ will be described below. As shown in FIG. 15, the second open angle γL is expressed by the following equations (2) and (3):

$$\gamma L = \arcsin((f/2+t)/(CL/2)) + \arctan(f/(D/2+a))[\text{rad}] \quad (2)$$

$$f = b - t/2 \quad (3)$$

where CL is a longest distance from the main axis L1 of the rotary shaft 15 to the outermost edge 18b of the sealing surface 18 in the second side part 22, b is an offset amount of the rotary shaft 15 offset upward from the center P1 of the valve hole 16 in a direction of the axis L2 of the valve element 14, and t is the thickness of the sealing surface 18 in an axial direction. These equations (2) and (3) are established from a relationship that when an angle formed between a line extending from the main axis L1 to the outermost edge 18b of the sealing surface 18 in the second side part 22 and a plane including the outermost edges 18a and 18b of the sealing surface 18 is a second angle αL1, and a virtual circle having a diameter corresponding to the length CL and contacting both of the outermost edge 18b and the main axis L1 is plotted and an intersection of the line passing through the innermost edges 18c and 18d with the virtual circle is a virtual innermost edge 18d1, the second open angle γL can be determined by determining a third angle αL2 formed by a line from the center point O of the virtual circle to the virtual innermost edge 18dl and a plane including the outermost edge 18b of the sealing surface 18 and the virtual innermost edge 18dl. The second open angle γL is an angle defined by the line passing through the outermost edge 18b of the sealing surface 18 in the second side part 22 and the virtual innermost edge 18dl. This line intersects with a line from the main axis L1 of the rotary shaft 15 to the virtual innermost edge 18dl.

In the present embodiment, the optimal open angle y of the sealing surface 18 is set to meet the condition of the following equation (4).

$$\gamma L < \gamma < \gamma S \quad (4)$$

Figure 16:
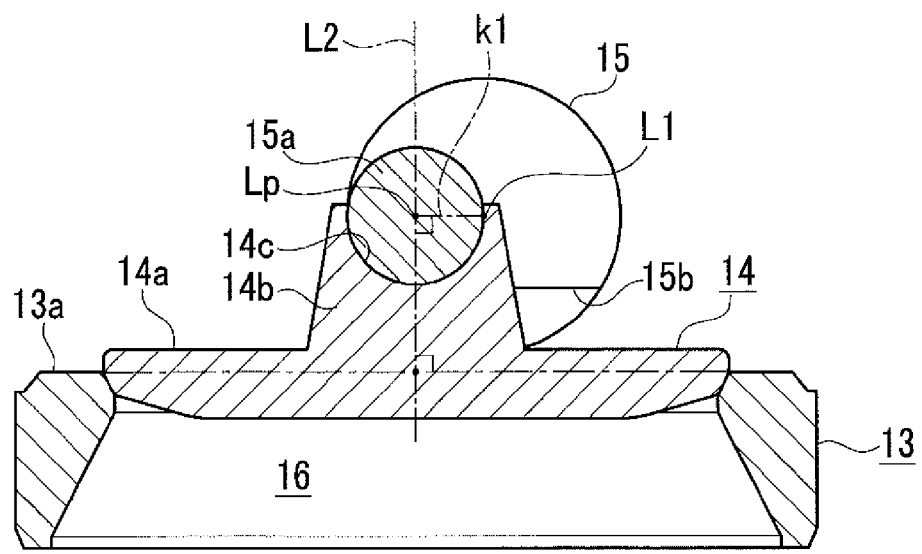
FIG. 16 is a sectional view showing a relationship between the valve seat, the valve element, and the rotary shaft, corresponding to FIG. 9, in the embodiment.

A method for fixing the valve element 14 to the rotary shaft 15 will be described below. FIGS. 16, 17, 18, and 19 are sectional views corresponding to FIG. 8 and showing a relationship between the valve seat 13, the valve element 14, and the rotary shaft 15. In the present embodiment, as shown in FIGS. 16-19, while the valve element 14 is horizontally seated on the valve seat 13, the attaching part 15a of the rotary shaft 15 is bonded by welding to the protrusion 14b of the valve element 14. An upper end of the protrusion 14b is formed with a curved recess 14c to receive the attaching part 15a. FIG. 16 illustrates a state where the valve element 14 is mounted on the rotary shaft 15 at a reference position with no error. Herein, the rotary shaft 15 is placed so that a line k1 joining the main axis L1 to the second axis Lp makes a right angle with the axis L2 of the valve element 14, i.e., is parallel to an upper end face 13a of the valve seat 13.

Figure 17:
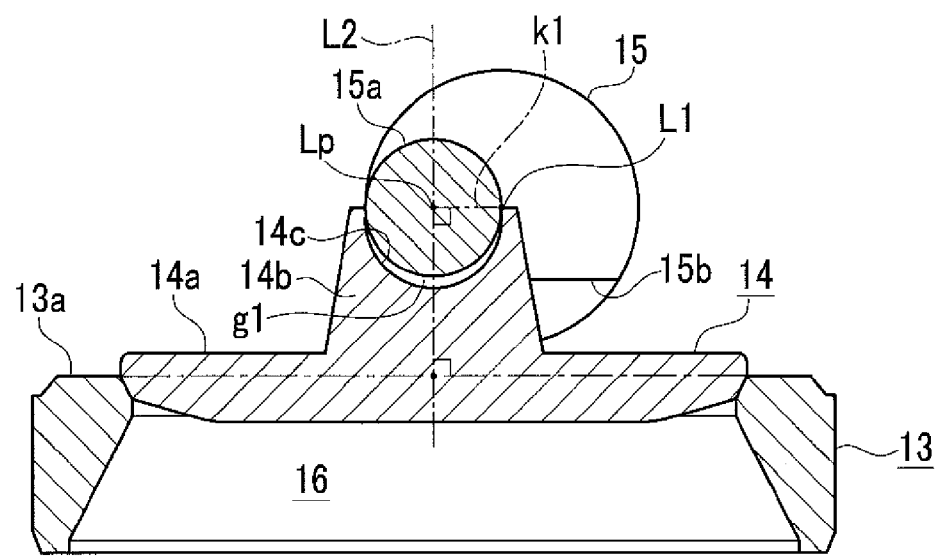
FIG. 17 is a sectional view showing a relationship between the valve seat, the valve element, and the rotary shaft, corresponding to FIG. 9, in the embodiment.
Figure 18:
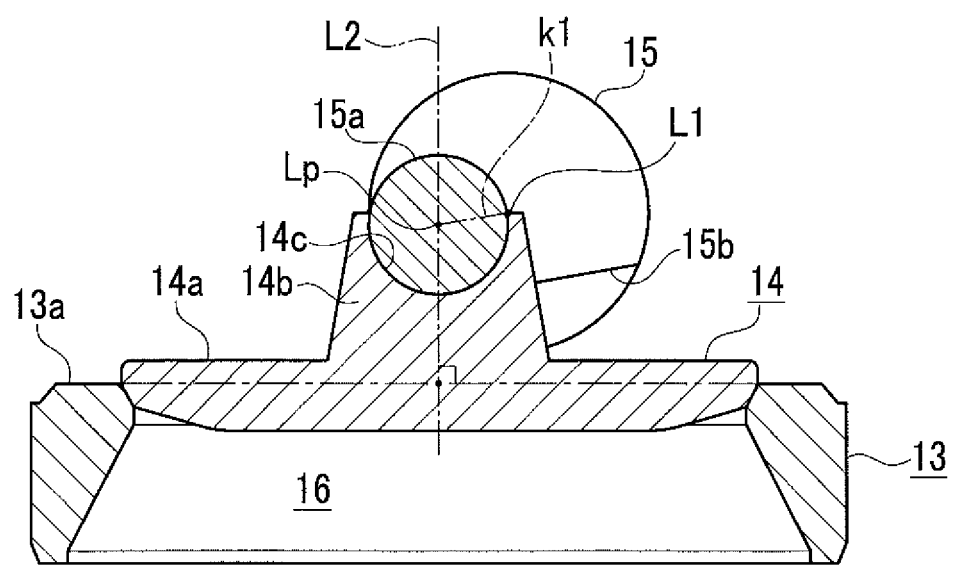
FIG. 18 is a sectional view showing a relationship between the valve seat, the valve element, and the rotary shaft, corresponding to FIG. 9, in the embodiment.

FIG. 17 shows a case where the distance between the rotary shaft 15 and the valve seat 13 is slightly farther than that in FIG. 16 due to variations in working accuracy, errors in assembling, and others. When the rotary shaft is placed so that the line k1 joining the main axis L1 to the second axis Lp is parallel to the upper end face 13a of the valve seat 13, a gap g1 is generated between the attaching part 15a and the curved recess 14c. In this case, when the valve element 14 is assembled with the rotary shaft 15 with the gap g1 remained therebetween, the valve element 14 gets lifted from the valve seat 13. This generates a gap between the valve seat 13 and the valve element 14, causing fluid leakage therethrough. In the present embodiment, however, the attaching part 15a is provided in a position eccentric from the main axis L1 of the rotary shaft 15, so that rotating the rotary shaft 15 enables adjusting the position of the attaching part 15a. To be concrete, the rotary shaft 15 has only to be rotated counterclockwise as shown in FIG. 18, thereby blocking up the gap g1, so that the valve element 14 can be assembled tightly with the rotary shaft 15. This configuration generates no gap between the valve seat 13 and the valve element 14 and thus can prevent an increase in leakage.

Figure 19:
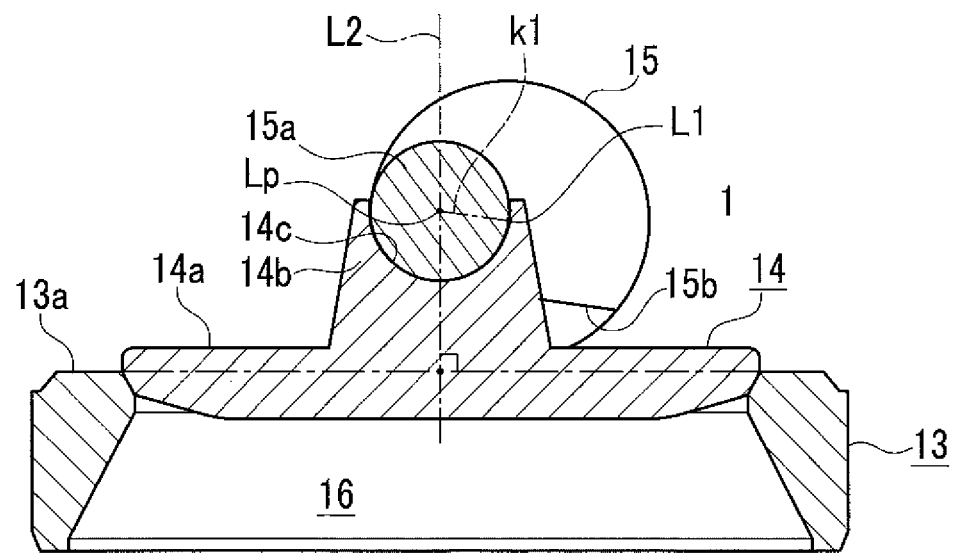
FIG. 19 is a sectional view showing a relationship between the valve seat, the valve element, and the rotary shaft, corresponding to FIG. 9, in the embodiment.
Figure 20:
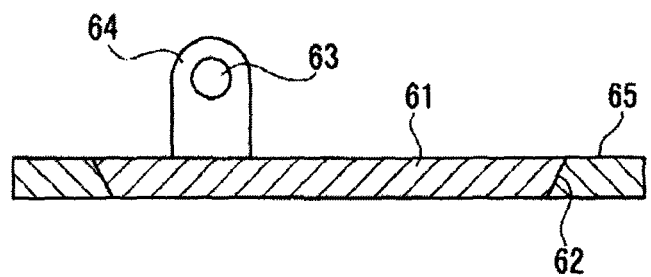
FIG. 20 is a sectional view showing a relationship between the valve seat, the valve element, and the rotary shaft in a related art.
Figure 21:
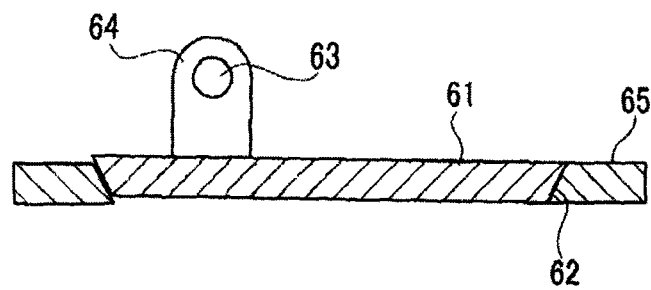
FIG. 21 is a sectional view showing a relationship between the valve seat, the valve element, and the rotary shaft in a related art.
Figure 22:
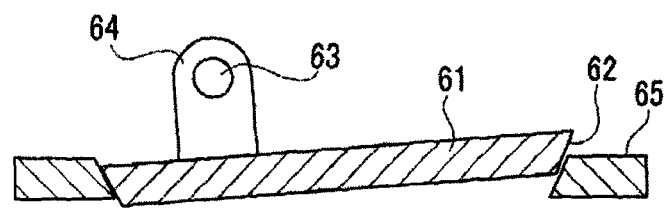
FIG. 22 is a sectional view showing a relationship between the valve seat, the valve element, and the rotary shaft in a related art.

To the contrary, FIG. 19 illustrates a state where the valve element 14 is assembled with the rotary shaft 15 with the distance between the rotary shaft 15 and the valve seat 13 made slightly shorter than that in FIG. 16 due to errors in assembling and other reasons. In this case, conversely to the case in FIG. 18, the rotary shaft 15 is rotated clockwise, thereby adjusting the position of the attaching part 15a in a direction to separate from the valve seat, and the valve element 14 is assembled with the rotary shaft 15. This configuration also generates no gap between the valve seat 13 and the valve element 14 and thus can prevent an increase in leakage.

In the present embodiment, the position where the line k1 joining the main axis L1 to the second axis Lp is parallel to the upper end face 13a of the valve seat 13 is defined as a reference. When the rotary shaft is rotated at a small angle from the reference position, movement of the rotary shaft in a direction perpendicular to the main axis L1 and the axis L2 of the valve element 14 can be minimized as compared with a movement amount of the rotary shaft in the direction of the axis L2 of the valve element 14. Since the attaching part 15a is formed in a columnar shape, even when the rotary shaft is rotated, the outer shape of the attaching part 15a remains unchanged. Accordingly, assembly quality of the attaching part 15a with the curved recess 14c of the protrusion 14b does not change and the reliability of their bonding surfaces can be advantageously made constant. The inner diameter of the curved recess 14c is designed to be a little larger than the outer diameter of the attaching part 15a, thereby allowing correction of a relatively positional displacement between the attaching part 15a and the valve element 14 in a direction perpendicular to the main axis L1 and the axis L2 of the valve element 14, so that the valve element 14 can be appropriately assembled with the rotary shaft 15

According to the double eccentric valve of the EGR valve 1 in the present embodiment described above, the valve element 14 is rotated about the main axis L1 of the rotary shaft 15 to move between the fully closed position where the sealing surface 18 of the valve element 14 contacts with the seat surface 17 of the valve seat 13 and the fully open position where the sealing surface 18 is furthest away from the seat surface 17. In the state where the valve element 14 is placed in the fully closed position, that is, in the fully closed state of the double eccentric valve, the valve hole 16 of the valve seat 13 is closed by the valve element 14, thus shutting off a EGR gas flow in the valve hole 16. Further, a clearance between the valve element 14 and the valve seat 13 is closed by contact of the sealing surface 18 and the seat surface 17. Since the attaching part of the rotary shaft 15 to which the valve element 14 is attached is provided in a position eccentric from the main axis L1 of the rotary shaft 15, the valve element 14 can be fixed to the rotary shaft 15 so that the valve element 14 in the fully closed position is seated on the valve seat 13. Accordingly, even when the valve seat 13 is not provided with any elastic member and the valve seat 13 and the valve element 14 are made of only metal which is a rigid body, leakage of EGR gas is prevented. In the related art, specifically, it is difficult to close a gap between the valve element and the valve seat or it is necessary to press the valve seat against the valve element by the elastic member to close a gap between the valve element and the valve seat. In the present embodiment, in contrast, the double eccentric valve can ensure sealing performance in the fully closed state simply by the configuration of the seat surface 17 of the valve seat 13 and the sealing surface 18 of the valve element 14 without particularly providing the elastic member.

A reference position of the rotary shaft is assumed to be the position defined when the second plane PL2 including the main axis L1 of the rotary shaft 15 and the second axis Lp of the attaching part 15a is parallel to the first plane PL1 formed by the outermost edges 18a and 18b of the sealing surface 18 in the state where the valve element 14 is placed in the fully closed position. Accordingly, it is possible to maximize the movement amount of the attaching part 15a in the direction of the axis L2 of the valve element 14 in association with small rotation of the rotary shaft 15, and thus maximize an adjustable range of the fully closed position.

In the present embodiment, the rotary shaft 15 is supported in a cantilever manner with respect to the valve housing 35 through the two bearings 37 and 38 arranged along the rotary shaft 15 and spaced from each other. These two bearings 37 and 38 can suppress the inclination of the main axis L1 of the rotary shaft 15. This can ensure the parallelism of the second plane PL2 with the first plane PL1 in the relationship between the valve seat 13, the valve element 14, and the rotary shaft 15.

In the present embodiment, the seat surface 17 of the valve seat 13 and the sealing surface 18 of the valve element 14 each have only to be formed in the uniform shape over respective entire circumferences. Thus, the valve seat 13 and the valve element 14 can be easily worked, or machined. This makes it possible to manufacture the foregoing double eccentric valve with ease and at low cost.

In the present embodiment, the interference between the rotary shaft 15 and the valve element 14 is avoided by the cutout 15b, so that the rotary shaft 15 and the valve element 14 come close to each other by just a distance corresponding to the cutout 15b. This can reduce a size of the assembled rotary shaft 15 and valve element 14. As alternatives, the cutout may be formed in the valve element 14 instead of the rotary shaft 15 or the cutout may be provided in both the rotary shaft 15 and the valve element 14.

In the present embodiment, since the valve element 14 is fixed to the rotary shaft 15 with the protrusion 14b bonded to the attaching part 15a eccentrically positioned from the main axis L1 of the rotary shaft 15, the valve element 14 is surely retained eccentrically with respect to the main axis L1 in relation to the main axis L1 which is a rotation center of the valve element 14. Further, since the protrusion 14b is located on the axis L2 of the valve element 14 and the valve element 14 including the protrusion 14b has a two-fold symmetric shape about the axis L2 of the valve element 14, the protrusion 14b does not need to be formed eccentrically from the axis L2 of the valve element 14. This configuration can facilitate manufacturing of the valve element 14. When the valve element 14 is to be assembled to the rotary shaft 15, its assembling direction does not have to be checked. Also in this regard, manufacturing of the double eccentric valve can be facilitated at low cost.

In the present embodiment, in the passage 11 in which the valve seat 13 and the valve element 14 are arranged, the valve element 14 is placed on a more upstream side than the valve seat 13 in the flow direction of EGR gas. In the state where the valve element 14 is placed in the fully closed position, therefore, the pressure of EGR gas acts in a direction to press the valve element 14 against the valve seat 13. Accordingly, the sealing performance between the valve seat 13 and the valve element 14, that is, between the seat surface 17 and the sealing surface 18 can be enhanced.

In the present embodiment, since the optimal open angle γ of the sealing surface 18 of the valve element 14 is set to an optimal angle determined between the second open angle γL and the first open angle γS, a rubbing amount between the sealing surface 18 of the valve element 14 and the seat surface 17 of the valve seat 13 can be minimized. In this regard, the double eccentric valve can reliably achieve improved valve-opening response and durability.

The present invention is not limited to the foregoing embodiment and may be embodied in other specific forms without departing from the essential characteristics thereof.

In the foregoing embodiment, for instance, the sealing surface 18 of the valve element 14 and the seat surface 17 of the valve seat 13 are each formed as a part of the lateral surface shape of a right circular cone having the same inclination all around this cone as shown in FIGS. 11 and 12. As an alternative, the sealing surface 18 and the seat surface 17 may be each formed as a part of a lateral surface shape of an oblique circular cone with an apex inclined from the central axis of the valve element. As another alternative, the sealing surface and the seat surface may be formed in a spherical shape. It is to be noted that a double eccentric valve provided with the sealing surface of the valve element designed as a lateral surface shape of an oblique circular cone is sometimes referred to as a triple eccentric valve. However, the double eccentric valve of the invention includes this triple eccentric valve.

In the present embodiment, the valve seat 13 is fixed by press fit on the step 10 formed in the passage 11. The invention is however not limited to this forming method of the valve seat 13. The valve seat 13 may be fixed by welding or formed integral with the valve housing.

In the foregoing embodiment, the rotary shaft 15 is supported in the cantilever manner with respect to the valve housing 35 and the attaching part 15a is provided at the distal end of the rotary shaft 15 for attachment of the valve element 14. As an alternative, it may be arranged to place the rotary shaft across the passage and support both sides of the rotary shaft by the valve housing so that the attaching part is placed in the passage.

In the foregoing embodiment, the attaching part 15a provided in the rotary shaft 15 is positioned eccentrically from the main axis L1 of the rotary shaft 15 and the protrusion 14b bonded to the attaching part 15a is located on the axis L2 of the valve element 14. As an alternative, the attaching part of the rotary shaft has only to be eccentric from the main axis and the attaching part of the valve element to the rotary shaft may be displaced from the axis of the valve element.

In the foregoing embodiment, the attaching part 15a and the protrusion 14b are bonded to each other in such a manner that the attaching part 15a of the rotary shaft 15 is placed to fit with the curved recess 14c of the protrusion 14b of the valve element 14. As an alternative, the protrusion may be formed with an insertion hole so that the attaching part of the rotary shaft is inserted in and bonded to the insertion hole.

In the foregoing embodiment, the attaching part 15a has a columnar shape, but the shape of the attaching part is not limited thereto and, for example, may be a prismatic (square columnar) shape such as a quadrangular prism shape or other shapes.

INDUSTRIAL APPLICABILITY

The present invention is utilizable in an EGR valve and an electronic throttle device and further a flow control valve for controlling a fluid flow rate.

REFERENCE SIGNS LIST

1 EGR valve
11 Passage
13 Valve seat
14 Valve element
14a Plate surface
14b Protrusion
15 Rotary shaft
15a Valve-element attaching part
15b Cutout
16 Valve hole
17 Seat surface
18 Sealing surface
18a Outermost edge
18b Outermost edge
18c Innermost edge
18d Innermost edge
35 Valve housing
37 First bearing
38 Second bearing
L1 Main axis (Axis of rotary shaft)
L2 Axis of valve element
L3 Central axis of valve hole
Lp Second axis (Axis of attaching part)
P1 Center of valve element
T1 Rotation path
T1a Rotation path
T1b Rotation path
T2 Rotation path
T2a Rotation path
T2b Rotation path
PL1 First plane
PL2 Second plane

The invention claimed is:

1. A double eccentric valve comprising:
a valve seat including a valve hole and an annular seat surface formed on an edge of the valve hole;
a valve element having a circular disc shape and including an annular sealing surface formed on an outer periphery, the sealing surface corresponding to the seat surface;
a passage allowing a fluid to flow through, the valve seat and the valve element being placed in the passage; and
a rotary shaft to rotate the valve element,
the rotary shaft having an axis extending across the passage and in a direction perpendicular to the passage, the rotary shaft being positioned eccentrically from a center of the valve hole in an extending direction of the passage and in a direction perpendicular to the passage, so that the valve element is configured to rotate about the axis of the rotary shaft between a fully closed position where the sealing surface contacts with the seat surface and a fully open position where the sealing surface is furthest away from the seat surface,
wherein the rotary shaft includes a distal end portion and a base end portion, the distal end portion is provided with an attaching part to which the valve element is attached, and, wherein when the axis of the base end portion is a main axis and an axis of the attaching part is a second axis, the second axis extends in parallel to the main axis and is positioned eccentrically from the main axis in a radial direction of the rotary shaft,
the double eccentric valve further comprises a housing,
the rotary shaft has a free end on a side with the distal end portion where the attaching part is provided, and the base end portion of the rotary shaft is supported in a cantilever manner to be rotatable with respect to the housing, and
the valve element is connected to the housing via only the rotary shaft, which is a single rotary shaft.

2. The double eccentric valve according to claim 1, wherein the rotary shaft is supported with respect to the housing through two bearings arranged along the rotary shaft and spaced apart from each other.

3. The double eccentric valve according to claim 1, wherein the attaching part has a columnar shape.

4. The double eccentric valve according to claim 1, wherein the rotary shaft is formed with a cutout to avoid interference between the attaching part attached to the valve element and the valve element.

5. The double eccentric valve according to claim 1, wherein the valve element is placed on a more upstream side than the valve seat in a flow direction of the fluid.

6. A double eccentric valve comprising:
   a valve seat including a valve hole and an annular seat surface formed on an edge of the valve hole;
   a valve element having a circular disc shape and including an annular sealing surface formed on an outer periphery, the sealing surface corresponding to the seat surface;
   a passage allowing a fluid to flow through, the valve seat and the valve element being placed in the passage; and
   a rotary shaft to rotate the valve element,
   the rotary shaft having an axis extending across the passage and in a direction perpendicular to the passage, the rotary shaft being positioned eccentrically from a center of the valve hole in an extending direction of the passage and in a direction perpendicular to the passage, so that the valve element is configured to rotate about the axis of the rotary shaft between a fully closed position where the sealing surface contacts with the seat surface and a fully open position where the sealing surface is furthest away from the seat surface,
   wherein the rotary shaft includes a distal end portion and a base end portion, the distal end portion is provided with an attaching part to which the valve element is attached, and, wherein when the axis of the base end portion is a main axis and an axis of the attaching part is a second axis, the second axis extends in parallel to the main axis and is positioned eccentrically from the main axis in a radial direction of the rotary shaft,
   the valve element includes a plate surface and a protrusion protruding from the plate surface, and the valve element is fixed to the rotary shaft by the protrusion bonded to the attaching part,
   the double eccentric valve further comprises a housing,
   the rotary shaft has a free end on a side with the distal end portion where the attaching part is provided, and the base end portion of the rotary shaft is supported in a cantilever manner to be rotatable with respect to the housing, and
   the valve element is connected to the housing via only the rotary shaft, which is a single rotary shaft.

7. The double eccentric valve according to claim 6, wherein the protrusion has a centerline coinciding with an axis of the valve element, and the valve element including the protrusion has a two-fold rotational symmetric shape with respect to the axis of the valve element, which is equal in shape even by rotation of the valve element by an angle of 180 degrees about the axis of the valve element.

8. The double eccentric valve according to claim 6, wherein the attaching part has a columnar shape.

9. The double eccentric valve according to claim 6, wherein the rotary shaft is formed with a cutout to avoid interference between the attaching part attached to the valve element and the valve element.

10. The double eccentric valve according to claim 6, wherein the protrusion of the valve element is formed with a curved recess having an inner diameter larger than an outer diameter of the attaching part of the rotary shaft.

11. A method for manufacturing a double eccentric valve comprising:
    a valve seat including a valve hole and an annular seat surface formed on an edge of the valve hole;
    a valve element having a circular disc shape and including an annular sealing surface formed on an outer periphery, the sealing surface corresponding to the seat surface;
    a passage allowing a fluid to flow through, the valve seat and the valve element being placed in the passage; and
    a rotary shaft to rotate the valve element,
    the rotary shaft having an axis extending across the passage and in a direction perpendicular to the passage, the rotary shaft being positioned eccentrically from a center of the valve hole in an extending direction of the passage and in a direction perpendicular to the passage, so that the valve element is configured to rotate about the axis of the rotary shaft between a fully closed position where the sealing surface contacts with the seat surface and a fully open position where the sealing surface is furthest away from the seat surface,
    wherein the rotary shaft includes a distal end portion and a base end portion, the distal end portion is provided with an attaching part to which the valve element is attached, and, wherein when the axis of the base end portion is a main axis and an axis of the attaching part is a second axis, the second axis extends in parallel to the main axis and is positioned eccentrically from the main axis in a radial direction of the rotary shaft,
    the valve element includes a plate surface and a protrusion protruding from the plate surface,
    the double eccentric valve further comprises a housing,
    the rotary shaft has a free end on a side with the distal end portion where the attaching part is provided, and the base end portion of the rotary shaft is supported in a cantilever manner to be rotatable with respect to the housing, and
    the valve element is connected to the housing via only the rotary shaft, which is a single rotary shaft, and
    the method comprises a step of welding the protrusion to the attaching part while the valve element is seated on the valve seat to fix the valve element to the rotary shaft.

\* \* \* \* \*